(12) United States Patent
Jarventausta et al.

(10) Patent No.: US 10,787,867 B2
(45) Date of Patent: Sep. 29, 2020

(54) GRIPPING DEVICE AND METHOD OF GRIPPING DRILLING TOOLS

(71) Applicant: SANDVIK MINING AND CONSTRUCTION OY, Tampere (FI)

(72) Inventors: Sami Jarventausta, Tampere (FI); Jukka Simila, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 178 days.

(21) Appl. No.: 16/005,162

(22) Filed: Jun. 11, 2018

(65) Prior Publication Data

US 2018/0355718 A1   Dec. 13, 2018

(30) Foreign Application Priority Data

Jun. 12, 2017 (EP) .................... 17175451

(51) Int. Cl.

| | | |
|---|---|---|
| *E21B 19/14* | (2006.01) | |
| *E21B 19/24* | (2006.01) | |
| *E21B 19/16* | (2006.01) | |
| *E21B 19/18* | (2006.01) | |
| *E21B 19/08* | (2006.01) | |
| *B25J 15/00* | (2006.01) | |
| *E21B 15/00* | (2006.01) | |
| *B23Q 3/157* | (2006.01) | |
| *B23Q 3/155* | (2006.01) | |

(52) U.S. Cl.
CPC .......... *E21B 19/08* (2013.01); *B25J 15/0023* (2013.01); *B25J 15/0047* (2013.01); *E21B 15/006* (2013.01); *E21B 19/14* (2013.01); *E21B 19/16* (2013.01); *E21B 19/18* (2013.01); *E21B 19/24* (2013.01); *B23Q 3/1554* (2013.01); *B23Q 3/15513* (2013.01); *B23Q 3/15722* (2016.11); *B23Q 3/15766* (2013.01)

(58) Field of Classification Search
CPC .......... E21B 4/003; E21B 19/14; E21B 19/24; E21B 19/16; E21B 19/18; Y10T 483/1783; Y10T 483/1786; Y10T 483/1788
USPC .............................................. 483/51, 52, 53
See application file for complete search history.

(56) References Cited

U.S. PATENT DOCUMENTS

| | | | | |
|---|---|---|---|---|
| 3,277,750 | A | * 10/1966 | Montgomery | .......... E21B 19/16 81/57.17 |
| 4,052,861 | A | 10/1977 | Malone et al. | |
| 4,099,784 | A | 7/1978 | Cooper | |
| 4,182,424 | A | * 1/1980 | Prebensen | ................ B23Q 1/76 175/210 |
| 5,249,625 | A | 10/1993 | Skipper et al. | |

(Continued)

FOREIGN PATENT DOCUMENTS

| | | |
|---|---|---|
| WO | 91/02693 A1 | 3/1991 |
| WO | 98/11322 A1 | 3/1998 |
| WO | 2009/156575 A1 | 12/2009 |

*Primary Examiner* — Cathleen R Hutchins

(74) *Attorney, Agent, or Firm* — Corinne R. Gorski

(57) ABSTRACT

A gripping device, rock drilling unit and method of gripping drilling tools is disclosed. The gripping device includes a frame and at least one elastic gripping element connected in a fluid-tight manner to the frame. The gripping element may be expanded by conveying pressurized fluid between surfaces of the frame and the gripping element, whereby the gripping element moves against surfaces of the drilling tool and generates friction forces and support.

10 Claims, 4 Drawing Sheets

(56) References Cited

U.S. PATENT DOCUMENTS

| | | | | |
|---|---|---|---|---|
| 6,161,617 A | * | 12/2000 | Gjedebo | ............ E21B 19/16 166/77.52 |
| 2012/0018222 A1 | * | 1/2012 | Hankins | ............ E21B 19/14 175/57 |

* cited by examiner

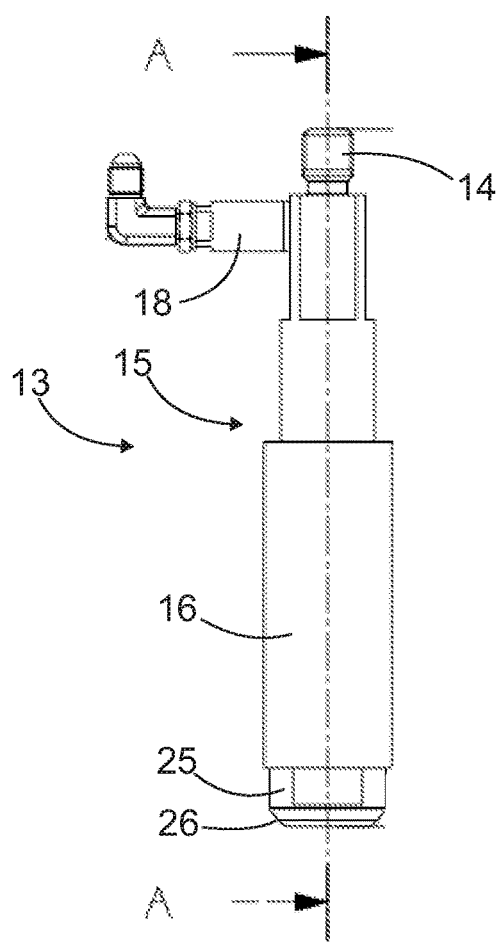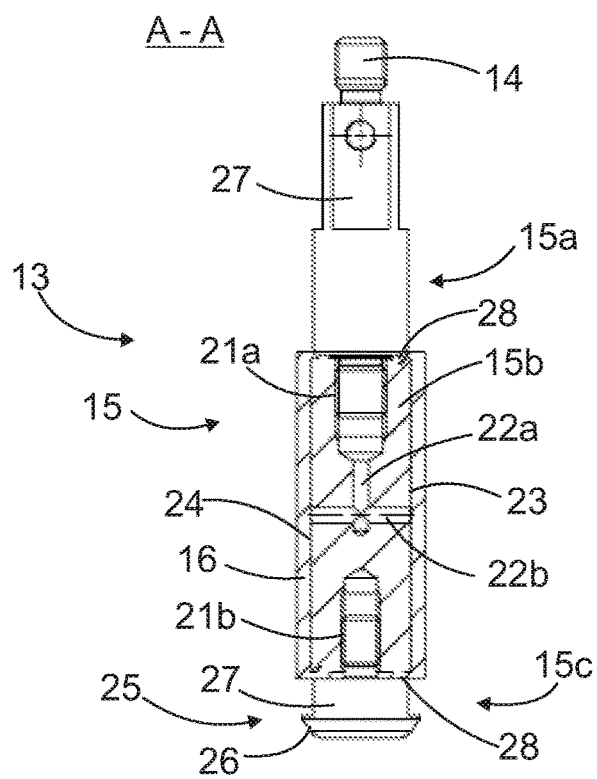
FIG. 6  FIG. 7
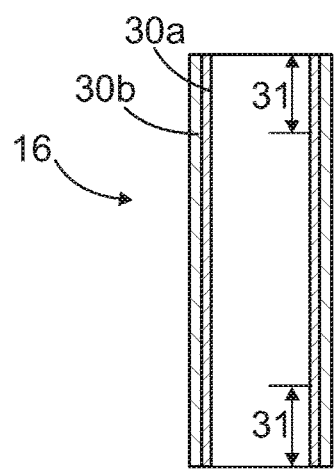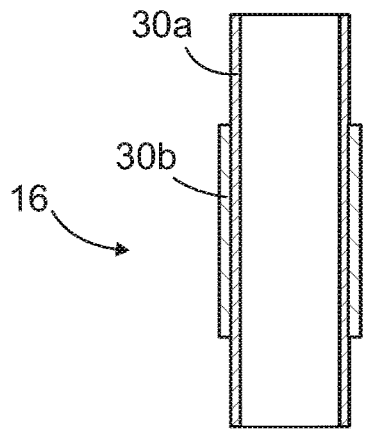
FIG. 8  FIG. 9

GRIPPING DEVICE AND METHOD OF GRIPPING DRILLING TOOLS

RELATED APPLICATION DATA

This application claims priority under 35 U.S.C. § 119 to EP Patent Application No. 17175451.8, filed on Jun. 12, 2017, which the entirety thereof is incorporated herein by reference.

TECHNICAL FIELD

The present disclosure relates to a gripping device for gripping drilling tools used in rock drilling. The gripping device includes a movable gripping element, which may be pressed against surfaces of the drilling tool for generating gripping force. The disclosure further relates to a rock drilling unit provided with the gripping device and to a method of gripping drilling tools by means of the gripping device.

BACKGROUND

Rock drilling rigs provided with drilling units are used in mines and at other work sites for drilling holes to rock material. The rock drilling unit includes a rock drilling machine for generating needed rotation and impact pulses for drilling equipment connected to the drilling machine. The drilling equipment may have one or more drill rods or tubes and a drill bit at the outermost end of the drilling equipment. The drill bits wear during use and a need exists to change them from time to time.

Automated handling of the drilling tools is demanding. Therefore, gripping devices for gripping the drilling tools are developed. However, the present gripping devices have shown to contain some disadvantages.

SUMMARY

An object of the invention is to provide a novel and improved gripping device and method for gripping drilling tools. The invention further relates to a drilling unit utilizing the disclosed gripping device.

To overcome the above disadvantages, the present disclosure is directed to a gripping device for gripping drilling tools, the gripping device including a frame and a gripping arrangement including at least one fluid-tight gripping element made of elastic material mounted to the frame and being movable relative to the frame. The frame includes at least one fluid channel arranged to feed pressurized fluid to the gripping element to expand the elastic gripping element relative to the frame, the frame of the gripping device including an elongated shaft. The gripping element is a tubular piece arranged on an outer surface of the frame. Ends of the gripping element are fastened to the frame in a fluid-tight manner and a central portion of the gripping element between the ends is free of fastening. The at least one fluid channel is in fluid connection to an inner surface of the central portion of the gripping element, whereby pressurized fluid fed through the at least one fluid channel is configured to expand the elastic gripping element at a portion between the ends.

A method for gripping drilling tools by means of a gripping device according to the disclosure includes the step of gripping a drilling tool by expanding at least one elastic and fluid-tight gripping element of the gripping device against surfaces of the drilling tool by means of pressurized fluid. The gripping device is partly inserted inside a central axial hole of the drilling tool such that the gripping element is enveloped by inner surfaces of the axial hole of the drilling tool. Pressurized fluid is conveyed to the gripping device and expandsg the elastic gripping element against the inner surfaces of the axial hole of the drilling tool, whereby friction forces are generated between the drilling tool and the gripping device.

An idea of the disclosed solution is that the gripping device includes at least one expandable gripping element. The gripping element is expanded by means of pressurized fluid. Further, the gripping element is made of fluid-tight elastic material. The gripping element is supported to a frame of the gripping device and the frame has one or more fluid channels for feeding the pressurized fluid to the elastic gripping element in order to make it to expand. The gripping force is generated by expanding the elastic gripping element against surfaces of the handled drilling tool by means of the pressurized fluid.

The gripping element may be expanded against surfaces of an inner hole or cavity of the drilling tool, whereby an external expansion occurs, or alternatively, the gripping element may be expanded against outer surfaces of the drilling tool, whereby an internal expansion occurs.

An advantage of the disclosed solution is that the gripping device is applicable for handling of drilling tools with different dimensions. The expandable gripping element adjusts well for differently sized and shaped drilling tools. Thereby, a need for dedicated gripping devices with special dimensions or shapes for each separately sized and shaped drilling tools can be avoided. In other words, the disclosed gripping device is more versatile than the known solutions. Further, the expandable elastic material of the gripping element provides good friction properties between the gripping device and the drilling tool whereby connection between them is secure. A further advantage is that the elastic gripping element guarantees gentle handling for the drilling tools. Critical surfaces of the drilling tools are not damaged by over dimensioned gripping forces and use of unsuitable gripping elements.

According to an embodiment, the frame of the gripping device includes an elongated shaft and the gripping element is a tubular or sleeve-like piece arranged on an outer surface of the frame. Between the shaft and the tubular element is a fluid tight connection. Thus, ends of the gripping sleeve may be fastened to the frame in a fluid-tight manner. However, a central portion of the elastic sleeve between the ends is free of fastening so that the central portion may be expand by directing pressurized fluid to the central portion. One or more fluid channels lead to an inner surface of the central portion of the sleeve whereby pressurized fluid may flow between surfaces of the elastic gripping element and the shaft or frame.

The disclosed gripping device may be inserted inside a central opening of a drilling tool and may then be actuated so that the elastic gripping element compresses against inner surfaces of the opening. The structure of the disclosed gripping device is simple and inexpensive.

According to an embodiment, the frame of the gripping device includes an elongated shaft and the gripping element is a sleeve-like elastic piece mounted on an outer surface of the frame. Further, the frame may have two-part structure having two frame components connected successively in the longitudinal direction. A first frame component includes connecting surfaces for connecting the gripping device to an external device and a second frame component is provided with the elastic gripping element.

The second component is a replaceable component and it may be mounted and dismounted to the first frame component, which is without the expanding element and serves as a base part of the frame. Between the first and second frame components are coupling members allowing easy mounting and dismounting. The coupling members may include screw members, or alternatively, any suitable fast coupling means may be implemented.

Both frame components may be made of metallic material. Since the gripping device is intended to be used in harsh conditions, the frame components are preferably made of stainless steel or any other corrosion tolerating material. The elastic gripping element may be a component which is integrated to be part of the second frame component by means of permanent fastening. An advantage of the disclosed solution is that the second frame component provided with the elastic gripping element may be easily changed when worn or damaged.

According to an embodiment, the frame of the gripping device includes an elongated shaft and the gripping element is a sleeve-like elastic piece mounted on the frame. The elongated frame has a first end portion provided with connecting surfaces for connecting the gripping device to a manipulator, actuator or corresponding movement element, and an opposite second end portion of the frame is provided with a guide element. The guide element is a separate piece connectable to the frame in a removable manner Between the frame and the guide element may be a screw coupling, or alternatively, the mounting may be based on suitable fast coupling means.

The guide element protects the frame and the elastic gripping sleeve against impacts in the axial direction. Thus, the guide element serves as a protective wear part, which may be easily changed. The gripping device may have three successively arranged components, namely a first basic frame component, a second frame component provided with the elastic sleeve, and the guide element connected to the second frame component. Alternatively, the frame may be one single piece and the replaceable guide element is mounted to it. Further, the changeable guide element may be shaped so that it tapers from the second end of the frame towards its free end. The tapered surfaces at the front end of the gripping device guide it to an opening or cavity of the drilling tool even if the gripping device and the drilling tool are not in perfect alignment.

According to an embodiment, the gripping element is made of rubber material. Natural rubber is suitable material for the purpose since it combines high tensile and tear strength with an outstanding resistance to fatigue. Properties of the natural rubber may be adjusted by compounding, whereby it a versatile material. However, also synthetic rubber materials and compounds may be used.

According to an embodiment, the elastic gripping element includes two successive material layers so that a first material layer is facing towards the frame and a second material layer is facing away from the gripping device. The first material layer and the second material layer may be made of different rubber compounds. Material of the first layer may be selected so that fastening principle of the gripping element to the frame is taken into consideration. Then the material of the first layer may be selected to be suitable for glue bonding or vulcanization. Material of the second layer may be selected in accordance to required mechanical and operational properties. The material of the second layer should be wear resistant and have suitable friction and expansion properties, for example. An advantage of this embodiment is that properties of the elastic gripping element may be adjusted by the selection of different materials.

According to an embodiment, thickness of the elastic gripping element is 3-5 mm. The thickness of the element may be selected according to size of the elastic element and magnitude of pressure of the used pressure fluid, for example. When the elastic gripping element is a sleeve like piece, the sleeve may have uniform thickness between its ends. Then, the structure of the sleeve-like element is simple and inexpensive. However, in an alternative solution, the elastic gripping element has at least two portions which have differing cross-sections relative to each other. Then the gripping element may have different expanding properties at the mentioned sections with the differing cross-sections. The different cross-sections may have different wall thickness. Further, outer surfaces of the different sections may have differing shapes so that the elastic element may be provided with specially shaped contact surface areas, which are to be pressed against the handled drilling tool. When the elastic element is the sleeve like piece, the central portion of the sleeve may shaped contact surfaces, such as an annular protrusion, for improving coupling properties.

According to an embodiment, the gripping element is made of synthetic elastic polymer material.

According to an embodiment, the gripping element is made of rubber material and the fastening of the gripping element comprises vulcanization. Then selected portions of the gripping element may be fasted against fastening areas arranged on surfaces of the frame of the gripping device. The vulcanization may be executed in an autoclave under elevated temperature and pressure. A durable bonding is formed between the frame and the rubber made element during the vulcanization process.

According to an embodiment, the fastening of the gripping element is an adhesive bond with the frame. Adhesive bonding is fast and easy to execute and requires no special equipment.

According to an embodiment, the fastening of the gripping element includes at least one mechanical fastening element for pressing the gripping element at the fastening areas against surfaces of the frame. The mechanical fastening element may be a fastening ring enveloping the tubular gripping element at its both end portions.

According to an embodiment, the fastening of the gripping element is a combination of two or more fastening systems disclosed in the previous embodiments.

According to an embodiment, both axial ends of the sleeve-like gripping element are provided with transversal fastening flanges, which are compressed between two successive components of the frame in axial direction. Then the gripping element has mechanical fastening at its both ends. This fastening principle may be combined with the above disclosed fastening systems.

According to an embodiment, maximum expansion of the elastic gripping element under pressure is dimensioned to be at least 30% compared to the initial non-pressurized state. An advantage of the great expansion capacity is that the gripping device may be used in a versatile manner for handling drilling tools with different dimensions and shapes.

According to an embodiment, expansion capacity of the gripping element is 30-50 mm. The surface of the frame, which is enveloped by the elastic gripping element is cylindrical and has a first diameter. The elastic gripping element has a second diameter when being expanded, and difference between the first and second diameters is between 30-50 mm Thus, the gripping element adjusts well for different drilling tools with differing bore dimensions.

According to an embodiment, the elastic gripping element is configured to form an annular fluid space when being expanded. The annular fluid space may envelope the shaft-like frame part of the gripping device.

According to an embodiment, the gripping element includes a closed pressure space defined by the at least one fluid channel, the elastic gripping element and the frame. The closed pressure space inside the gripping device is configured to be pressurized and discharged through one single fluid port. The fluid port may be located on the side surface of the frame at the first end portion of the frame. Then the fluid may be conveyed by means of an external hose or corresponding fluid passage to the gripping device and the structure of the transfer device may be without fluid passages. Alternatively, the fluid port and pressure channel are located on axial center line of the frame. In this embodiment, the axial feeding and discharging of the fluid is utilized and there is no need for external fluid passages, whereby the structure may be compact and the fluid passages inside the structures are well protected.

According to an embodiment, the feeding of the pressurized fluid for expanding the gripping element is monitored for detecting leakages of the gripping element or its mounting. Thereby, the condition of the gripping device may be monitored and preventive maintenance measures may be executed when abnormal behavior is detected. Due to the monitoring, proper and safe operation of the device may be ensured.

According to an embodiment, the elastic gripping element is freely expandable in response to magnitude of volume of the fed fluid. Thus, the gripping apparatus is without mechanical elements limiting magnitude of the expansion. The freely expandable gripping element adjusts well against surfaces of the handled drilling tool. Because there are no limiting elements, the structure may be simple.

According to an embodiment, the gripping device is operated pneumatically. Thus, the operating fluid of the gripping device may be pressurized air.

According to an embodiment, the gripping device is operated hydraulically. Thus, the operating fluid of the gripping device may be pressurized hydraulic oil.

According to an embodiment, the gripping device is connected to a movable arm or manipulator of a transfer de-vice. The transfer device may be configured to move the gripping device between a drilling tool storage device and drilling axis.

According to an embodiment, the gripping device is arranged in connection to a drilling tool storage device. Then a magazine for storing drilling tools may have several gripping devices for holding the drilling tools inside the magazine. Thus, the gripping devices are operable during storage of the drilling tools.

According to an embodiment, the drilling tool is a drill bit, an adaptor tube or element connected to the drill bit, or a drill hole tube through which the drill hole is drilled. All of the mentioned drilling tools are relatively short and lightweight pieces and they include a central through hole or blind bore inside which the gripping element may be inserted.

According to an embodiment, the gripping device includes a gripping element configured to execute internal expansion against an outer surface of a drilling tool. The gripping device may include a sleeve-like frame having an outer circumference and an inner circumference. The elastic gripping element is arranged on the inner circumference of the frame and is configured to be expanded by means of pressurized fluid against outer surfaces of a drilling tool which is enveloped by the gripping device. Alternatively, the frame is not a sleeve-like piece but includes an opening inside which the drilling tool may be inserted and wherein inner surfaces of which opening are provided with one or more expandable gripping elements. The disclosed embodiment may be implemented in drilling tool storages or magazines, for example.

The above disclosed embodiments may be combined in order to form suitable solutions having those of the above features that are needed.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 6 is a schematic side view showing a gripping device comprising three successively arranged removable components.

FIG. 7 is a cross-sectional view of FIG. 6 along A-A.

FIG. 8 is a schematic cross-sectional view of a sleeve-like expandable gripping element having two successive layers made of different material.

FIG. 9 is a schematic cross-sectional view of a sleeve-like expandable gripping element having sections with differing cross-sectional dimensions.

For the sake of clarity, the figures show some embodiments of the disclosed solution in a simplified manner. In the figures, like reference numerals identify like elements.

DETAILED DESCRIPTION

Figure 1:
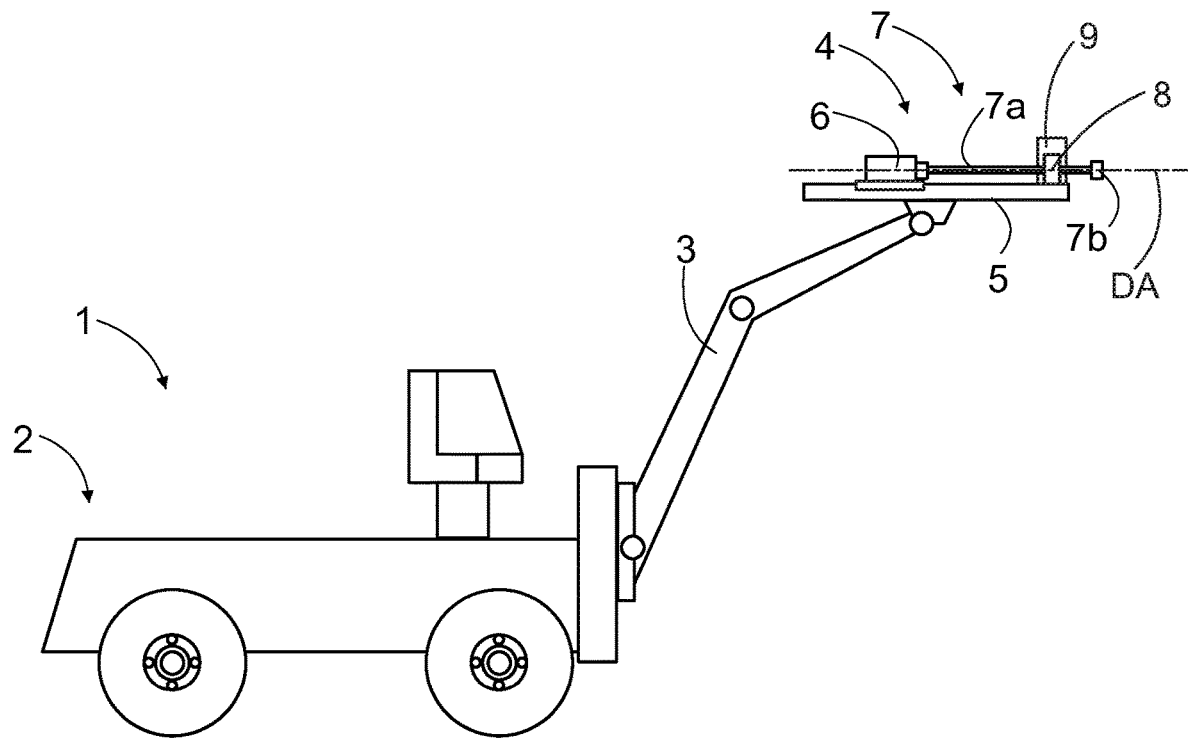
FIG. 1 is a schematic side view of a rock drilling rig provided with a drilling unit.

FIG. 1 shows a rock drilling rig 1 including a carrier 2, at least one drilling boom 3 and a drilling unit 4 at distal end portion of the boom 3. The drilling unit 4 includes a feed beam 5 and a rock drilling machine 6 supported to the feed beam 5 and arranged to be move longitudinally along drilling axis DA by means of a feed device. Drilling tools 7, such as drill rods 7a and drill bits 7b may be fastened to the drilling machine 6 for directing impact pulses and rotation to rock surface being drilled. At a front end portion of the feed beam may be a holding device 8 or holding jaws, for supporting the drilling tools 7 stationary on the drilling axis DA when the drilling tools are mounted and dismounted. Further, the drilling unit 4 may have a magazine 9 for storing several drilling tools 7. In order to move the drilling tools between the magazine 9 and the drilling axis DA, the drilling unit has one or more transfer devices and a gripping device, principles of which are shown in a simplified manner in FIG. 2.

Although the rock drilling rig disclosed in FIG. 1 is intended for operating in underground mine spaces the disclosed solution may be implemented in surface drilling solutions as well. Furthermore, also rock bolting rigs may have drilling units and may thereby implement the disclosed solution for handling the required tools.

Figure 2:
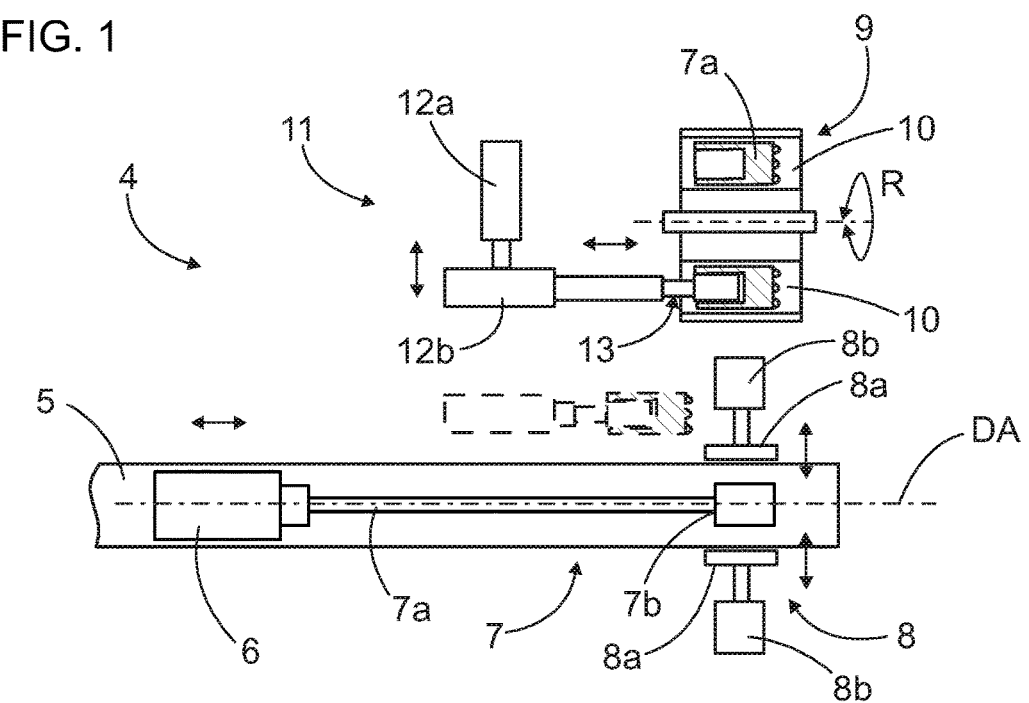
FIG. 2 is a schematic top view of a drilling unit provided with drilling tool storing and handling devices.

FIG. 2 discloses a drilling unit 4 including a magazine 9 for storing drill bits 7a. The magazine 9 may have storage spaces 10 inside which the drilling tools 7 may be inserted, or alternatively, the magazine 9 may have a clamping device arranged to be clamped against outer surfaces of the drilling tools 7. The magazine 9 may be rotated around a turning axis whereby stored drilling tools and empty spaces may be indexed to a base position so that they are accessible by a transfer device 11. The transfer device 11 may have a first actuator 12a for moving the transfer device 11 in a transverse direction relative to the drilling axis DA and a second actuator 12b for providing axial movements. Part of the transfer device 11 is shown in broken lines for demonstrating the movements of the transfer device. Further, the transfer device 11 is provided with a gripping device 13 for gripping the drilling tools 7 when changing worn or damaged tools, for example.

The gripping device 13 may be inserted inside an interior space of the drill bit 7b, the drill rod 7a or any other used drilling tool. The gripping device is applicable also for handling adaptor tubes or corresponding elements connected to the drill bit, and also drill hole tubes through which the drill bit may penetrate when drill holes are being drilled. The gripping device 13 may include an expandable gripping element for providing needed support forces and friction for allowing transfer movements of the drilling tool 7. The transfer device 11 is configured to transfer the drilling tool to the drilling axis DA wherein the drilling tool 7 is supported by a holding device 8 having holding jaws 8a and one or more holding actuators 8b. The drilling tools 7 may be kept stationary on the drilling axis DA when connection screws between the drilling tools are connected and disconnected by rotation movement generated by the drilling machine 6. The drilling machine 6 may be reversed on the drilling axis DA for allowing the transfer device 11 to position the drilling tools 7 to the holding device 8.

Structures of the holding device 8, the magazine 9 and the transfer device 11 may differ from the ones disclosed in FIG. 2. For example, the transfer device 11 may be a kind of robot arm or manipulator, the magazine 9 may be indexed by linear movements, and the holding device may have one single actuator for moving the jaws 8a.

Figure 3:
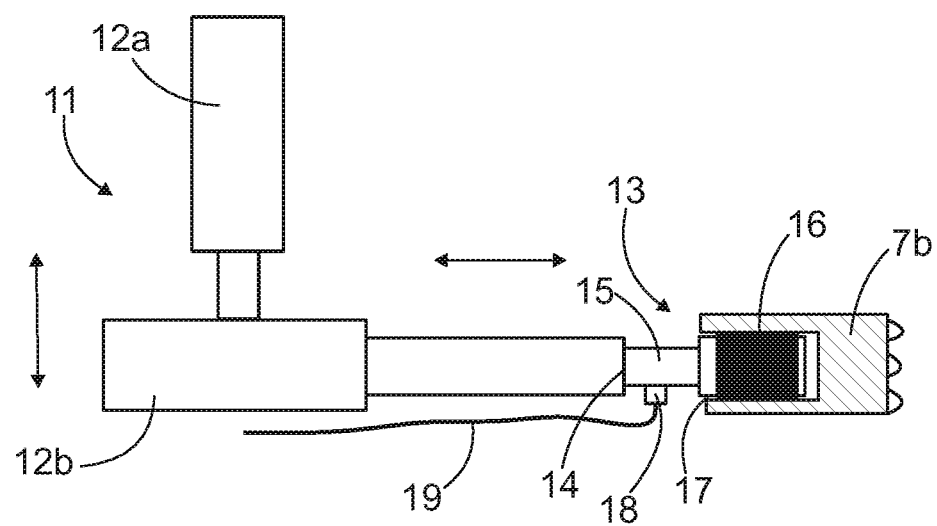
FIG. 3 is a schematic view of handling apparatus provided with a gripping device for gripping a drilling tool by means of an expandable gripping element.

FIG. 3 discloses a gripping device 13 connected to an outermost end of a transfer device 11 by means of connecting surfaces 14, which may have screw mounting members or fast coupling members, for example. The gripping device 13 includes a frame 15 and an expandable gripping element 16 at an outermost end portion of the shaft-like frame 15. The outermost end portion of the frame 15 is inserted inside an opening 17 or central bore of the drill bit 7b where after the gripping element 16 is expanded by directing pressurized fluid through a fluid port 18 between surfaces of the frame 15 and the gripping element 16, which is made of elastic material. The fluid port 18 may be in fluid connection to a pressure source by means of a tube 19 or flexible fluid passage. The pressurize fluid may also be discharged through the same fluid port 18 when the expansion is removed. Actuators 12a, 12b of the transfer device 11 may be hydraulic cylinders or linear motors, for example.

Figure 4:
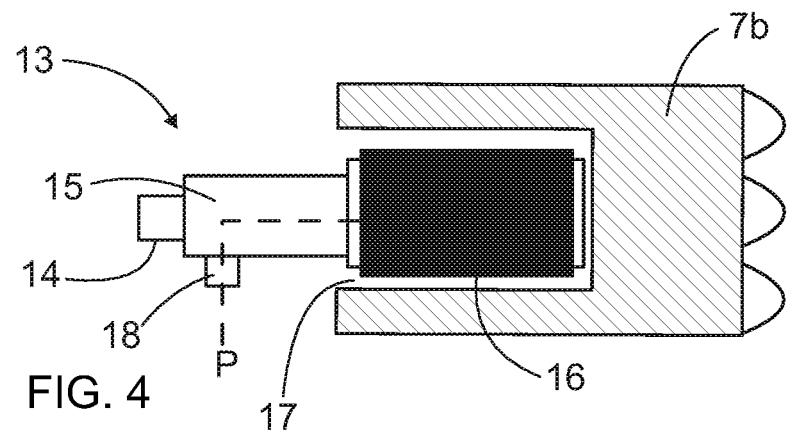
FIG. 4 is a schematic view showing a gripping device in a non-expanded insertion mode and being inserted into an interior bore of a drill bit.
Figure 5:
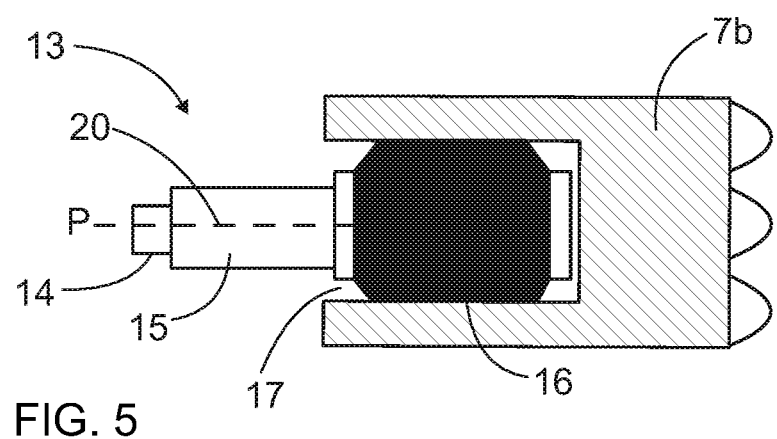
FIG. 5 is a schematic view showing a gripping device in a gripping mode, wherein a gripping element is expanded radially against surfaces of the interior bore of the drill bit.

FIG. 4 shows the gripping device in an insertion mode wherein the gripping element 16 is in inoperable state and can be pushed inside the opening 17 of the drill bit 7b. In FIG. 5 the gripping device 13 is pressurized and the elastic gripping element 16 is thereby expanded and pressed against inner periphery of the opening 17. The expansion may be executed by pneumatically or hydraulically. In FIG. 5 the pressurized fluid P is conveyed along an axial fluid passage 20 through the frame 15, whereby the transfer device and connecting surfaces 14 or elements are also provided with suitable axial fluid passages. In FIG. 4 a side surface of the frame 15 is provided with a fluid port 18 allowing connection to an external fluid passage.

FIGS. 6 and 7 disclose a gripping device 13 the frame 15 of which has three frame components 15a, 15b and 15c arranged axially successively and connected to each other by means of screw joints 21a and 21b. The first frame component 15a includes the connecting surfaces 14 for connecting the gripping device 13 to the transfer or handling device. In FIGS. 6 and 7 the connecting surfaces 14 include a collar, which may be gripped by a coupling device of the transfer device. The first frame component 15a includes a fluid port 18 too. At the opposite end to the connecting surfaces 14 may be a protruding portion provided with connecting screws. Respectively, the second frame component 15b may have a threaded opening for receiving the threaded protrusion of the first frame component. At an opposite end of the second frame component 15b may also be a threaded opening for receiving a threaded protrusion of the third frame component 15c. The frame 15 of the gripping device 13 may thereby be easily dismounted and mounted whereby change of worn or damaged components is facilitated. The second frame component 15b and the gripping element 16 may be a pre-assembled unity, which is easy and fast to change at the work site. The second component 15b includes an axial fluid passage 22a and at least one transverse fluid passage 22b for conveying the pressurized fluid between an outer surface 23 of the second frame 15b and an inner surface 24 of the gripping element 16. The third frame component 15c may protect the free end of the gripping device 13 against wear and impacts. The third frame component 15c may also serve as a guide element 25 wherefore it may chave a bevelled portion 26 or it may taper towards its free end. The frame components 15a and 15b may also include flat surfaces 27 formed for mounting tools.

As can be seen in FIG. 7 the sleeve-like elastic gripping element 16 may have transverse portions 28 or flanges at its both ends. Thus, the transverse portions 28 are compressed between the frame components 15-15c when the frame 15 of the gripping device is assembled. However, the fastening of the gripping element 16 may be without the disclosed mechanical fastening and may be based on solely to glue bonding, for example.

FIG. 8 discloses a sleeve-like gripping element 16 including an inner sleeve portion 30a and an outer sleeve portion 30b. The sleeve portions 30a, 30b may be made of different materials. Material of the inner sleeve portion 30a may be selected according to fastening properties. At both ends of the sleeve are internal fastening portions 31 which may be glue bonded or vulcanized against the second frame component 15b shown in the previous FIG. 7. Material of the inner sleeve portion 30a may be selected so that it suits well for such fastening. Material of the outer sleeve 30b may be selected according to the needed mechanical properties.

FIG. 9 is a highly simplified presentation of a gripping element 16 having portions with different cross-sectional dimensions. The outer sleeve portion 30b may cover only the central portion of the sleeve, whereby wall thickness is greater at the central portion than at the end portions. The outer sleeve portion 30b may form a protruding part and may serve as a contact element.

Figure 10:
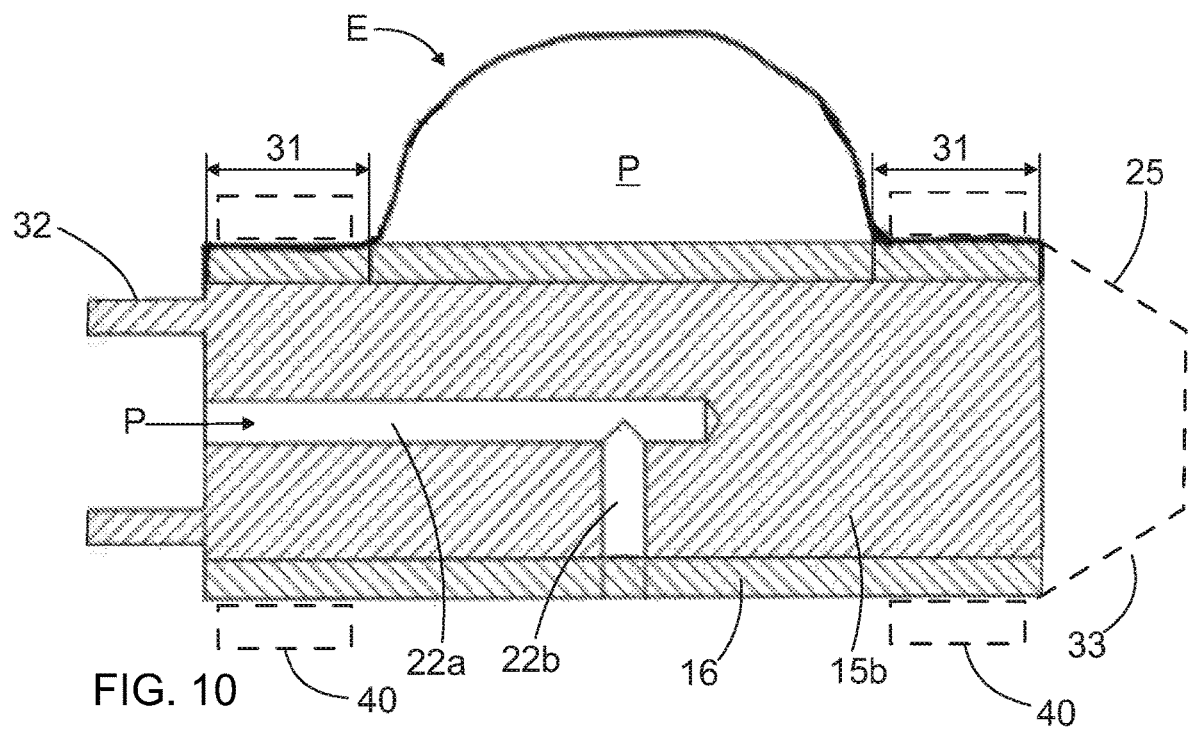
FIG. 10 is a schematic cross-sectional view of an end part of the gripping device and demonstrates fastening and expansion of the elastic gripping element.

FIG. 10 discloses by means of a simplified expansion curve E how the elastic gripping element 16 may expand at its central portion when fluid pressure P is conveyed through the channels 22a and 22b inside it. The end portions of the sleeve like gripping element 13 include fastening portions 31 wherein the gripping element is fastened in a fluid-tight manner to the second frame component 15b. Therefore, the end portions of the sleeve do not expand. The sleeve may expand 30% or more in the radial direction during the expansion mode. The rear end of the second frame component may include a coupling element 32 with screw surfaces and the front end may have a replaceable guide element 25 with tapered guide surfaces 33. The guide element 25 is shown only in broken lines and in a highly simplified manner.

The fastening of the gripping element 16 may include either vulcanization or glue bonding, or both. In addition to, or alternatively, the fastening may be at least one mechanical fastening element 40 for pressing the gripping element 16 at the fastening portions 31 against surfaces of the frame 15. The mechanical fastening element 40 may be a fastening ring enveloping the tubular gripping element 16 at its both end portions.

Figure 11:
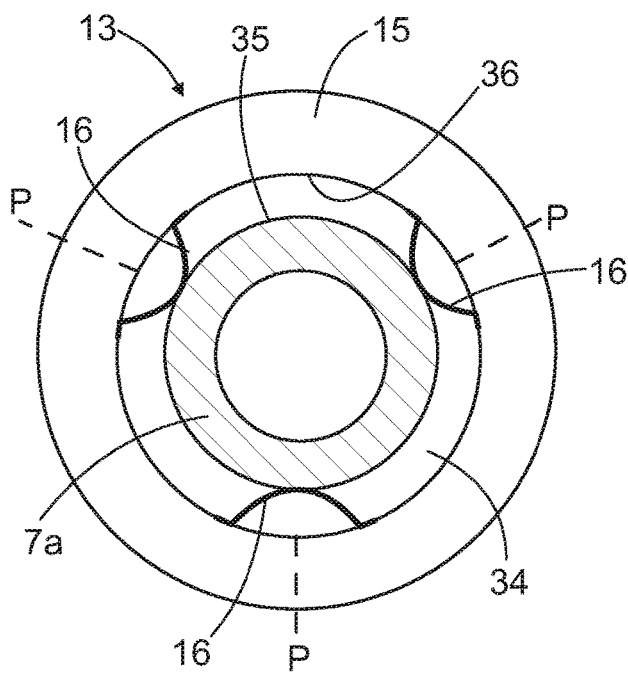
FIG. 11 is a schematic axial view of an alternative gripping device including a sleeve-like frame and several expandable gripping elements arranged on an inner surface of the sleeve.
Figure 12:
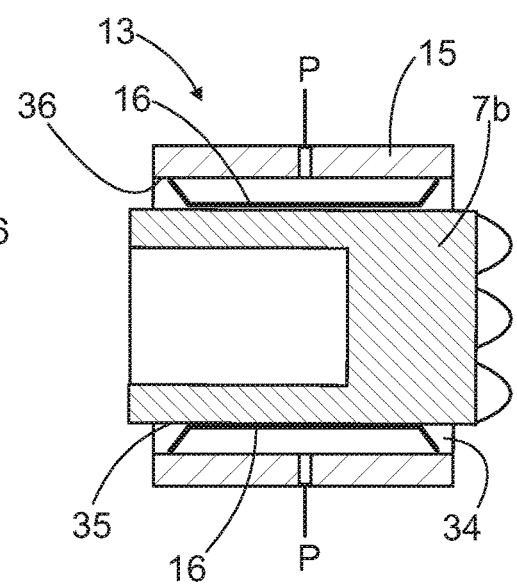
FIG. 12 is a schematic side view of a gripping device configured to expand radially against outer surfaces of a drill bit which is located inside an inner space of the gripping device.

FIGS. 11 and 12 disclose alternative solutions for the previous figures, wherein the elastic gripping element performs an external expansion against surfaces of an inner bore or opening of the drilling tool. In FIGS. 11 and 12 the gripping is based on internal expansion of one or more gripping elements. In FIG. 11 the gripping device includes a sleeve like frame 15 an inner surface of which has several elastic gripping elements 16. Inside the frame 15 is a space 34 inside which a drill rod 7a or other drilling tool may be inserted. When pressurized fluid P is conveyed inside the gripping elements 16 they expand and are pressed against an outer surface 35 of the drilling tool. The elastic gripping elements may be mounted to an inner surface 36 of the frame 15 by means of gluing agent, mechanical fastening means, vulcanization, or by combining the mentioned fastening methods. In FIG. 12 the gripping elements 16 have been expanded against an outer surface 35 of a drill bit 7b.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A gripping device for gripping drilling bits, the gripping device comprising:
a frame, wherein the frame includes a first end and a second end, wherein at a portion of the first end connecting surfaces are arranged for connecting the gripping device to an external device and at a portion of the second end a separate guide element arranged as a protective wear part is removably connected to the frame; and
a gripping arrangement including at least one fluid-tight gripping element made of elastic material mounted to the frame and being movable relative to the frame, the elastic gripping element being located between the connecting surfaces and the guide element in an axial direction of the frame, wherein the frame includes at least one fluid channel arranged to feed pressurized fluid to the elastic gripping element to expand the elastic gripping element relative to the frame, the frame of the gripping device including an elongated shaft, the elastic gripping element being a tubular piece arranged on an outer surface of the frame, ends of the elastic gripping element being fastened to the frame in a fluid-tight manner and a central portion of the elastic gripping element between the ends is free of fastening [N]$_2$ the elastic gripping element being located between the connecting surfaces and the guide element in an axial direction of the frame, and the at least one fluid channel being in fluid connection to an inner surface of the central portion of the elastic gripping element, whereby pressurized fluid fed through the at least one fluid channel is configured to expand the elastic gripping element at a portion between the ends.

2. The gripping device as claimed in claim 1, wherein the frame includes at least two elongated frame components connected successively in a longitudinal direction of the frame components, the at least two elongated frame components including a first frame component having connecting surfaces for connecting the gripping device to an external device and a second frame component provided with the elastic gripping element, wherein between the first and second frame components are coupling members arranged for mounting and dismounting the second frame component to the first frame component, whereby the second component is a replaceable component provided with the expandable elastic gripping element.

3. The gripping device as claimed in claim 1, wherein the elastic gripping element is made of a rubber material.

4. The gripping device as claimed in claim 3, wherein the fastening of the elastic gripping element comprises vulcanization against fastening areas on surfaces of the frame.

5. The gripping device as claimed in claim 1, wherein a maximum expansion of the elastic gripping element under pressure is dimensioned to be at least 30% compared to an initial non-pressurized state.

6. The gripping device as claimed in claim 1, wherein the at least one fluid channel, the elastic gripping element and the frame define a closed pressure space inside the gripping device, and the closed pressure space is configured to be pressurized and discharged through one single fluid port.

7. The gripping device as claimed in claim 1, wherein the elastic gripping element is freely expandable in response to a magnitude of volume of the fed fluid, whereby the gripping device is without mechanical elements limiting magnitude of the expansion.

8. The gripping device as claimed in claim 1, wherein the gripping device is operated pneumatically.

9. A rock drilling unit comprising:
a feed beam;
a rock drilling machine supported to the feed beam and arranged to move longitudinally along a drilling axis;
a magazine for storing several drilling bits;
a transfer device for moving the drilling bits between the magazine and the drilling axis; and at least one gripping device for gripping the drilling bits, wherein the gripping device is in accordance with the claim 1.

10. A method of gripping drilling bits by means of a gripping device, the method comprising:
- gripping a drilling bit by expanding at least one elastic and fluid-tight gripping element of the gripping device against surfaces of the drilling bit by means of pressurized fluid;
- inserting the gripping device partly inside a central axial hole of the drilling bit such that the gripping element is enveloped by inner surfaces of the axial hole of the drilling bit; and
- conveying pressurized fluid to the gripping device and expanding the elastic gripping element against the inner surfaces of the axial hole of the drilling bit, whereby friction forces are generated between the drilling bit and the gripping device.

\* \* \* \* \*